Sept. 1, 1959     W. H. PARKER     2,902,118

WHEEL BRAKE ADJUSTABLE ANCHOR

Filed Jan. 31, 1955

INVENTOR
WARREN H. PARKER
BY Gardner + Zimmerman
ATTORNEYS

United States Patent Office 2,902,118
Patented Sept. 1, 1959

2,902,118

WHEEL BRAKE ADJUSTABLE ANCHOR

Warren H. Parker, Oakland, Calif., assignor of one-third to Charles W. Butler and one-third to Charles Bork, both of Oakland, Calif.

Application January 31, 1955, Serial No. 484,867

1 Claim. (Cl. 188—78)

This invention relates to vehicle brakes, and is more particularly directed towards the type of brake construction in which the brake shoe may have its pivotal connection or anchor adjustable, so as to permit proper centering of the brake shoe relative to the brake drum.

In conventional vehicles, there is a brake drum attached to each wheel hub. Disposed within the hub is usually a pair of brake shoes of the internal expansion type; the brake shoe, upon actuation of the braking system, being expanded outwardly to engage the inner peripheral surface of the brake drum so as to slow down or halt further movement of the wheel hub and consequently of the vehicle. Also, as is well known in the art, the brake shoe is generally pivotally anchored at one end thereof and is arranged to be forced outwardly against the drum by a brake cylinder positioned adjacent the pivot point of the shoe. In view of the fact that the shoes cannot be made with precision accuracy, as in general they merely comprise metal stampings, it will be readily appreciated that with variation in shoes, and a fixed anchor or pivot point for the shoes, it is an impossible matter to adjust the shoe so that all portions thereof are equidistant from the center of the brake drum. If there is any eccentricity to the outer braking surface of the shoe, merely a portion of the shoe is utilized in performing the braking operation and this obviously does not afford proper or adequate braking service. In order to overcome the foregoing difficulty, many vehicles have heretofore been provided with some means for adjusting the shoes from the outside of the wheel backing plate and such adjustment has permitted the proper setting of the respective shoes on the plates, so as to materially increase the brake efficiency.

However, certain cars, and particularly those of recent design, are provided with suspension links or lugs on the outer surface of the backing plate and these suspension links, or one of such links, is positioned in opposed relationship to the anchor or pivot for the shoe. The positioning of the link thereby interferes with the use of a conventional brake shoe anchor pin adjustment, and accordingly certain cars have been put on the market with mere cylindrical anchor portions against which the arcuate end of the brake shoe is pivoted. This does not permit any adjustment of the brake shoe in the manner above mentioned and consequently the braking efficiency and life of the brake lining is seriously reduced and even with perfect brake linings it is many times impossible to fix the brakes to afford safety in driving.

Accordingly, it is an object of the present invention to provide an adjustable anchor for a brake shoe which is mounted and may be adjusted from entirely inside the brake assembly with the drum and wheel removed.

A further object of this invention is to provide apparatus of the character described which may be readily incorporated on a fixed anchor type of brake with a minimum of difficulty and expense.

A further object of the invention is to provide an adjustable brake shoe anchor of the type described in which means are provided for readily moving the anchor point for the brake shoe and which may be readily locked to maintain such position, such locking means may further serve to clamp the brake cylinder in operative position.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
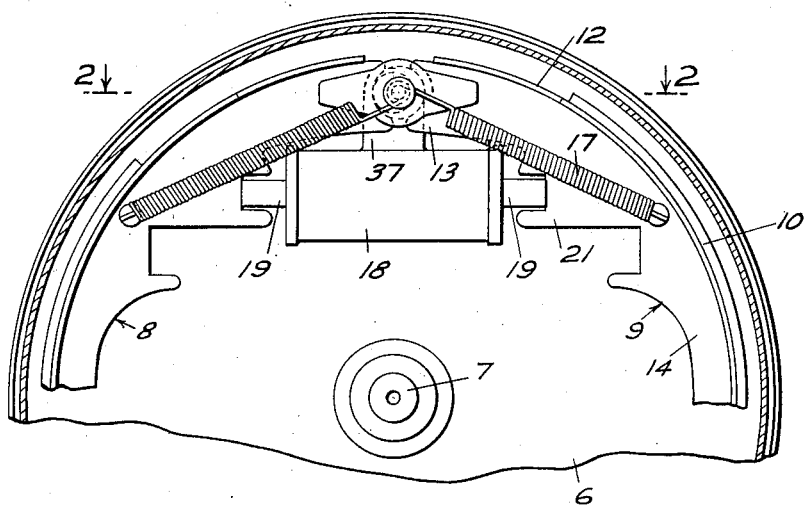
Figure 1 is a top plan view of a portion of a brake assembly with the brake shoes positioned on the adjustable anchor of the present invention.

As shown in the accompanying drawing, a conventional wheel and brake therefor will usually include a circular disk or backing plate 6 to which a spindle 7 is centrally located and positioned for rotatable support of the brake drum (not shown). Also, as is well known, the brake shoes, designated by the numerals 8 and 9 respectively, are positioned on the plate 6 for limited outward expansion so as to force the asbestos or other lining 10 carried on a flange 12 of the shoe towards frictional engagement with the inner peripheral surface of the brake drum. It will be seen that the end 13 of each shoe web 14 is of arcuate configuration and is engaged with a portion of the outer peripheral surface of an anchor pin. The respective shoes are normally urged towards their innermost or inoperative position by springs 17 attached at its respective ends to the anchor pin and to a medial portion of the shoe web. Expansion of the shoes is effected through a brake cylinder 18 which is provided with links 19 operatively engaged with notched portions 21 of the shoes. In this manner, upon actuation of the brake, the links 19 are moved outwardly and cause the shoes to likewise expand or move outwardly so as to engage the brake drum.

As was previously explained, in order to provide optimum braking operation, it is essential that all portions of the outer peripheral surface of the brake shoe, and particularly the lining thereof, be equidistant from the drum so that upon expansion or outward movement of the shoes, the entire lining will engage the brake drum. In view of the fact that the shoes may have slight variations, if the anchor point is fixed, it is impossible to properly align the shoes in the above described manner. However, by providing an eccentric anchor it is possible to obtain a proper adjustment of the shoe. In the past, certain types of eccentric anchors for the distal ends of the shoes have been provided from exteriorly of the plate 6. However, with certain present day vehicle construction, one or more lugs 23 are positioned on the outside of the disk in opposed relation to the anchor position of the shoes. This prevents the conventional type of anchoring means to be utilized.

Accordingly, as the principal feature of the present invention, I have provided an anchor for brake shoes which may be mounted and adjusted from entirely within the brake assembly and which will serve to locate the pivot or anchor position of the shoes so as to insure proper braking efficiency.

Figure 2:
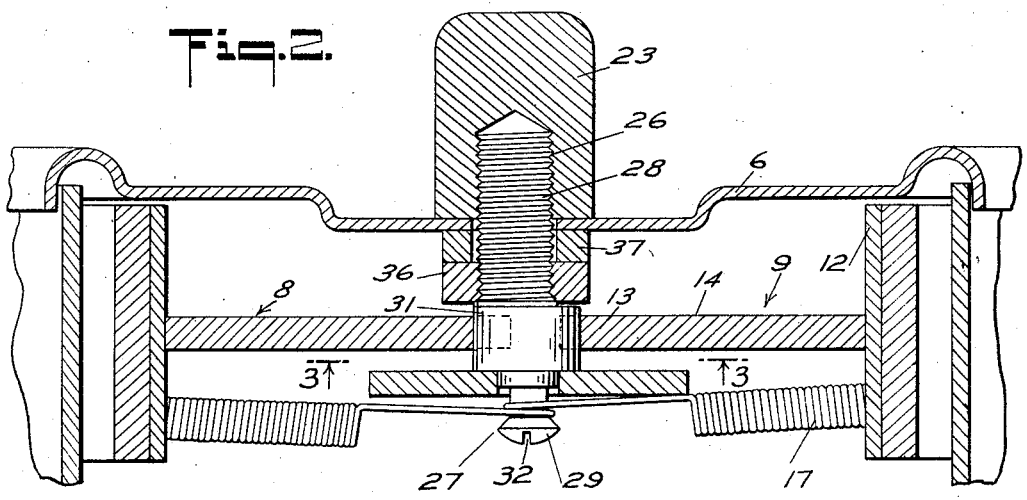
Figure 2 is a cross-sectional view taken substantially in the plane indicated by line 2—2 of Figure 1.
Figure 3:
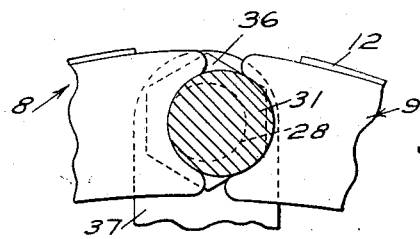
Figure 3 is a cross sectional view taken substantially in the plane indicated by line 3—3 of Figure 2.

As here illustrated, one of the lugs 23 which is secured to the outer surface of the wheel plate and utilized in wheel suspension, is tapped as indicated at 26 to receive the anchor pin 27 of the present invention. The pin 27 is provided with a threaded shank portion 28 which extends for a substantial distance beyond the threaded bore in the lug 23 and interiorly of the plate 6. Adjacent the head 29 of the pin there is provided a cylindrical portion 31 which, as best seen in Figures 2 and 3 of the drawings is mounted eccentrically from the axis of the pin shank 28. Preferably, the head 29 is axially aligned with the axis of the cylindrical portion 31 and it will be readily appreciated that as the arcuate end portions 13 of the shoe engage a portion of the outer periphery of cylinder 31, that by rotating the head 29, the anchor position of the shoe may be readily varied and selectively adjusted. To facilitate the turning of the cylinder, the head 29 may be slotted as indicated at 32 so as to permit screw driver engagement. Thus, it will be appreciated that the head 29 and its aligned cylinder 31 may be readily rotated, but as the axis thereof is offset from the axis of the threaded shank 28, rotation of the unit will clearly move the anchor position of the respective shoes.

There are several devices available on the market for determining the proper position of the shoe and most of these devices include a member adapted to rotate on the spindle 7 with an arm and an extension overlying the brake shoe flange and lining. By rotating the member about the spindle, any eccentricity of the shoe may be readily ascertained and by rotating the cylinder 31 in one or the other direction the shoe may be properly positioned concentrically with the spindle.

Once the adjustment is determined, there is provided a lock nut 36 which is engageable with the threaded shank 28, and by tightening the latter against the plate 6, further or accidental rotation of the anchor pin is effectively prevented. However, in order to likewise lock the cylinder 18 in proper position, the latter is provided with a lug 37 which extends outwardly from the medial portion of the cylinder and is arranged to lie on the inner surface of the plate. This lug 37 when in operative position may be placed over the shank and is freely movable thereabout. The nut 36 is then screwed down against the lug 37, such nut then performing the dual function of locking the cylinder in place as well as preventing further relative rotation of the anchor pin.

While the anchor of the present invention is simple in construction and may be readily installed on vehicles not presently equipped with any brake shoe adjusting means, it will be appreciated that the same will adequately fulfill the function of providing an adjustable anchor position so as to permit proper shoe adjustment. It will also be understood that the entire adjustment is made from the inside of the brake assembly rather than on the outside as in many present day braking systems so that the operator while turning the pin has visual control over the movement of the brake shoe and lining relative to the central spindle or any other device used in centering of the shoes.

What is claimed is:

A wheel structure comprising a generally circular member and a centrally disposed spindle extending axially therefrom on which a brake drum may be rotatably journaled, a lug having an axially threaded bore offset from said spindle and extending axially from and secured to said member in the opposite direction as said spindle, said member having a pin-receiving aperture in alignment with said lug, a brake shoe of arcuate configuration overlying a surface of said member and including a web portion and a flanged portion, said web portion lying parallel to the general plane of said member and having an arcuate end portion, an anchor pin extending through said aperture and having threads adjacent one end engaged with said lug bore threads and extending axially therefrom parallel to said flanged portion, a medial portion of said pin being contiguous to said arcuate end portion having a cylindrical configuration with the axis thereof parallel to and offset from the axis of said threaded pin portion whereby on rotation thereof said cylindrical portion will move eccentrically about the axis of said threaded pin portion, said cylindrical portion being engageable with said arcuate end portion of said brake shoe web and forming an anchor therefor, a locking nut engageable with said threaded portion of said pin intermediate said circular member and said cylindrical pin portion and movable towards said member to clamp said pin in selected positions of relative rotation, and said pin having tool receiving means adjacent the other end thereof for rotation of said pin.

References Cited in the file of this patent

UNITED STATES PATENTS

| | | |
|---|---|---|
| 1,327,068 | Stephens | Jan. 6, 1920 |
| 1,848,428 | Loweke | Mar. 8, 1932 |
| 2,024,847 | Chambers | Dec. 17, 1935 |
| 2,239,916 | Hunt | Apr. 29, 1941 |
| 2,242,733 | Whitten | May 20, 1941 |
| 2,407,487 | Forbes | Sept. 10, 1946 |
| 2,548,044 | Neale | Apr. 10, 1951 |
| 2,623,613 | Booth | Dec. 30, 1952 |
| 2,745,516 | Smith | May 15, 1956 |

FOREIGN PATENTS

| | | |
|---|---|---|
| 854,076 | France | Jan. 2, 1940 |
| 487,316 | Great Britain | June 17, 1938 |